United States Patent
Hodgkinson et al.

(10) Patent No.: US 7,209,437 B1
(45) Date of Patent: Apr. 24, 2007

(54) COMPUTER COMMUNICATION PROVIDING QUALITY OF SERVICE

(75) Inventors: Terence G Hodgkinson, Woodbridge (GB); Younes Cherradi, Ipswich (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/787,197

(22) PCT Filed: Oct. 11, 1999

(86) PCT No.: PCT/GB99/03353

§ 371 (c)(1),
(2), (4) Date: Mar. 15, 2001

(87) PCT Pub. No.: WO00/22795

PCT Pub. Date: Apr. 20, 2000

(30) Foreign Application Priority Data

Oct. 15, 1998  (GB) ................... 9822550.1

(51) Int. Cl.
  *G06F 11/00* (2006.01)
  *G06F 15/173* (2006.01)
  *H04L 12/56* (2006.01)
(52) U.S. Cl. ............. 370/230; 370/235; 370/395.21; 370/412; 709/225; 709/238
(58) Field of Classification Search ........ 370/229–234, 370/235–240, 395.21, 392, 412; 709/225–226, 709/229–242
See application file for complete search history.

(56) References Cited

U.S. PATENT DOCUMENTS

| | | | |
|---|---|---|---|
| 5,367,523 A * | 11/1994 | Chang et al. ........... | 370/235 |
| 5,680,389 A * | 10/1997 | Douglas et al. ........ | 370/228 |
| 5,809,078 A * | 9/1998 | Tani et al. ........... | 375/259 |
| 5,875,175 A | 2/1999 | Sherer et al. | |
| 5,917,822 A | 6/1999 | Lyles et al. | |
| 5,995,606 A * | 11/1999 | Civanlar et al. ....... | 379/207.13 |
| 6,041,039 A * | 3/2000 | Kilkki et al. .......... | 370/230 |

(Continued)

FOREIGN PATENT DOCUMENTS

WO    WO 94/14263    6/1994

(Continued)

OTHER PUBLICATIONS

Cheng, "Quality of Services Based on Both Call Admission and Cell Scheduling", Computer Networks and ISDN Systems 29 (1997), pp. 555-567.

(Continued)

*Primary Examiner*—Chi Pham
*Assistant Examiner*—Tri H. Phan
(74) *Attorney, Agent, or Firm*—Nixon & Vanderhye P.C.

(57) ABSTRACT

A method is provided for more efficiently transmitting data from a server computer to a client computer over a communications network, the nodes of which are capable of providing two classes of transmission quality. Data is transmitted using the high priority class until a local cache at the client computer is filled to a certain upper threshold, at which point the data is transmitted using the low priority class. If the local cache at the client computer subsequently reaches a lower threshold then the transmitted reverts to the use of the high priority class. The communications network may be connection-based (e.g. ATM) or connection-less (e.g. the Internet).

17 Claims, 3 Drawing Sheets

U.S. PATENT DOCUMENTS

| | | | |
|---|---|---|---|
| 6,108,307 A | | 8/2000 | McConnell et al. |
| 6,154,778 A | * | 11/2000 | Koistinen et al. ............ 709/228 |
| 6,229,788 B1 | | 5/2001 | Graves et al. |
| 6,304,544 B1 | | 10/2001 | Shimivassan et al. |
| 6,304,578 B1 | * | 10/2001 | Fluss ........................... 370/413 |
| 6,307,836 B1 | * | 10/2001 | Jones et al. .................. 370/230 |
| 6,320,845 B1 | * | 11/2001 | Davie .......................... 370/230 |
| 6,418,474 B1 | * | 7/2002 | Morris ........................ 709/233 |
| 6,490,252 B1 | * | 12/2002 | Riggan et al. ............... 370/237 |
| 6,538,989 B1 | * | 3/2003 | Carter et al. ................. 370/229 |
| 6,771,648 B1 | * | 8/2004 | Kim et al. ................ 370/395.2 |

FOREIGN PATENT DOCUMENTS

| | | | |
|---|---|---|---|
| WO | WO 9414263 A1 | * | 6/1994 |

OTHER PUBLICATIONS

Crowcroft et al., "A Rough Comparison of the IETF and ATM Service Models", IEEE Network Nov./Dec. 1995, pp. 11-16.

Bolla et al., "Adaptive Access Control of Multiple Traffic Classes in ATM Networks", GLOBECOM '91, vol. 1, Dec. 1991, pp. 0331-0338.

Floyd et al., "Link-Sharing and Resource Management Models for Packet Networks", IEEE/ACM Transactions on Networking, vol. 3, No. 4, Aug. 1995, pp. 365-386.

O'Neill, "Internetwork Futures", BT Technology Journal, vol. 15, No. 2, Apr. 1997, pp. 226-239.

White, "RSVP and Integrated Services in the Internet: A Tutorial", IEEE Communications Magazine, May 1997.

* cited by examiner

COMPUTER COMMUNICATION PROVIDING QUALITY OF SERVICE

BACKGROUND OF THE INVENTION

1. Field of the Invention

This invention relates to a method of communicating data from a server computer to a client computer.

2. Related Art

The Quality of Service (QoS) provided by operators of communications networks and systems is very important, especially in sectors for which a reliable, high-speed supply of information is required e.g. banking, share dealing, etc. The increase in the use of multimedia communications over computer networks, for example audio and video streaming, television multicasting and broadcasting, etc. will also increase the difficulty involved in supplying these services with an acceptable QoS to all users due to the high bandwidths required and the real-time nature of the data. While it may be possible to meet the desired QoS targets by increasing network capacity, i.e. increasing the capacity of transmission links and increasing the throughputs of switches and routers, this will necessitate significant capital expenditure and this investment may make the costs of the supplied services prohibitively high. It is clear that there would be significant advantages if services having a given QoS could be supplied without needing to make network investments of such an extensive nature.

One significant example of the levels of network resources required to provide guaranteed QoS levels is demonstrated by connection-based networks and connection-less networks. An example of a connection-based network is the public switched telephone network (PSTN) where a connection is established by the dialling of the required telephone number. An example of a connection-less network is the Internet, where data packets are routed by the network to their destination, the user having no control over the route taken by the individual packets. The drawback of establishing a connection is that, generally, a high price must be paid in order to maintain the connection and thus guarantee delivery of the information, whereas the transmission of a stream of packets in a connection-less manner may fail due to changes in the intermediate network elements, either due to equipment failure or network congestion. Disruption to the stream of packets is a lesser problem if, for example, a text file is being downloaded from a server computer. However, if real-time data, such as video or audio, is to be transmitted then the disruption of a packet stream, so that packets arrive out of order or at a slower rate than is required for data playback, may have serious repercussions. Accordingly, especially with regard to computer communications, there is a desire to attain the quality of service that is provided by connection-based transmission methods, without the additional cost that is incurred by setting up a connection.

BRIEF SUMMARY OF THE INVENTION

According to a first aspect of the present invention there is provided a method of transmitting data from a server computer to a client computer over a communications network, the data being routed between the server and client computers by a network node; the network node having an input to receive data from the server computer, the input being connected to first and second buffer elements, said buffer elements being connected to an output channel of predetermined bandwidth, wherein the first buffer element is preferentially allocated a portion of the output bandwidth and the second buffer element is allocated a remaining portion of the output bandwidth such that packets received in the first buffer element are transmitted in preference to packets received in the second buffer element; the method comprising the steps of:

(i) transmitting data from the server computer to the client computer using the first buffer element of the network node; and (ii) upon receipt by the server computer of a first control signal from the client computer, transmitting data from the server computer to the client computer using the second buffer element of the network node. Additionally the method may comprise the further step of (iii) reverting to transmitting data from the server computer to the client computer using the first buffer element of the network node upon receipt by the server computer of a second control signal from the client computer. The first control signal may be generated by the client computer in response to the level of data stored in a client computer data cache attaining a first, upper threshold value.

The second control signal may be generated by the client computer in response to the level of data stored in a client computer data cache attaining a second threshold value which is lower then the first threshold value.

Additionally, the communications route between the server computer and the client computer may comprise more than one network node and the selection of either the first or the second buffer elements in response to a control signal occurs within one or more of the network nodes which comprise the communications route between the server computer and the client computer.

A data carrier may contain computer executable code for loading into a computer for the performance of any of the above methods.

According to a second aspect of the present invention there is provided a method of receiving data at a client computer from a server computer, the data being routed over a communications network by a network node, the network node having an input to receive data from the server computer, the input being connected to first and second buffer elements, said buffer elements being connected to an output channel of predetermined bandwidth, wherein the first buffer element is preferentially allocated a portion of the output bandwidth and the second buffer element is allocated a remaining portion of the output bandwidth such that packets received in the first buffer element are transmitted in preference to packets received in the second buffer element; the method consisting the steps of:

(i) the client computer receiving data from the server computer via the first buffer element of the network node; and (ii) the client computer receiving data from the server computer via the second buffer element of the network node in response to the transmission of a first control signal from the client computer to the server computer. Additionally, the method may consist of the additional step of (iii) the client computer receiving data from the server computer via the first buffer element of the network node in response to the transmission of a second control signal from the client computer to the server computer.

The first control signal may be generated by the client computer in response to the level of data stored in a client computer data cache attaining a first, upper threshold value. The second control signal may be generated by the client computer in response to the level of data stored in a client computer data cache attaining a second threshold value which is lower then the first threshold value. Additionally, the communications route between the server computer and the client computer may comprise more than one network node and the selection of either the first or the second buffer elements in response to a control signal occurs within one or more of the network nodes which comprise the communications route between the server computer and the client computer. A data carrier may contain computer executable code for loading into a computer for the performance of the above method.

According to a third aspect of the present invention there is provided a server computer for transmitting data to a client computer over a communications network, the data being routed by a network node, wherein the data is transmitted from the server as a plurality of data packets, the server computer in use transmitting data packets containing a first identifier to enable the preferential forwarding of the data packets to the client computer at the network node; and wherein the server computer is responsive to a first control signal from the client computer to transmit data packets containing a second identifier to disable the preferential forwarding of the data packets to the client computer at the network node. Additionally, the server computer may be responsive to a second control signal from the client computer to transmit data packets containing the first identifier to re-enable the preferential forwarding of the data packets to the client computer at the network node.

BRIEF DESCRIPTION OF THE DRAWINGS

Embodiments of the invention will now be described, by way of example only, with reference to the accompanying drawings in which.

DETAILED DESCRIPTION OF EXEMPLARY EMBODIMENTS

Figure 1:
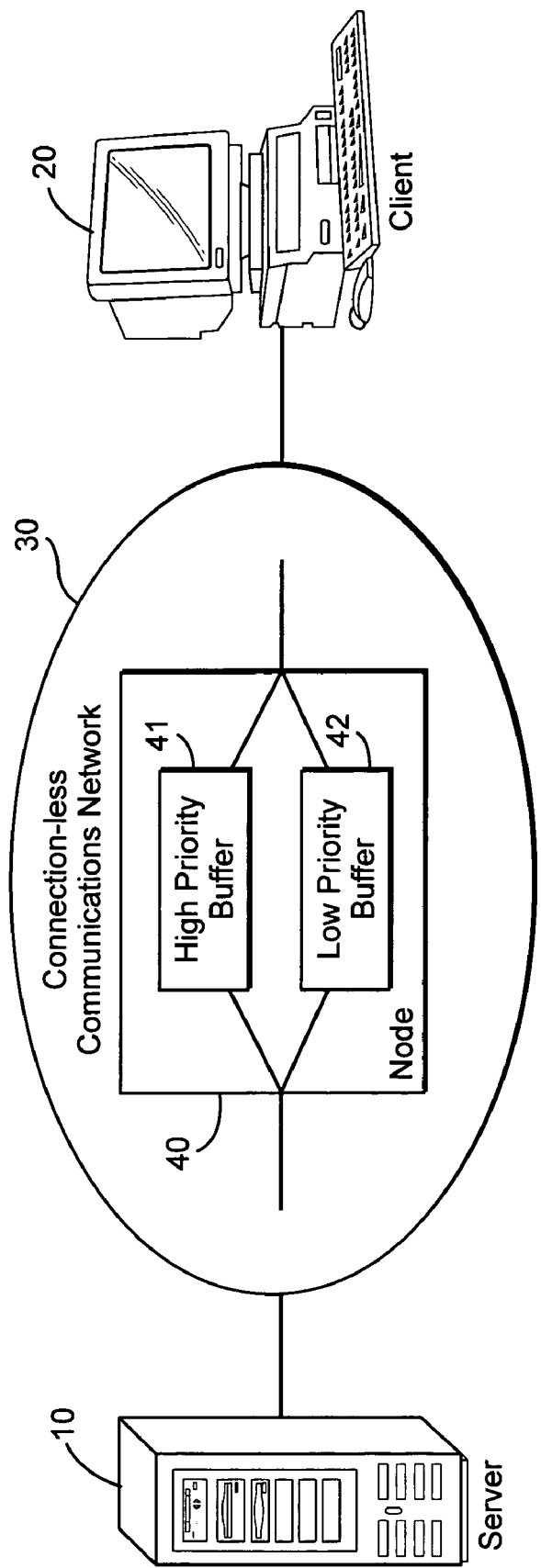
FIG. 1 shows a schematic depiction of a communications network over which a method of communication according to the invention may be used.

FIG. 1 shows a schematic depiction of a communications network over which a method of communication according to the invention may be used. Server computer 10 is connected to client computer 20 via a connection-less communications network 30, which includes at least one network node 40 in the communication route between the server computer 10 and the client computer 20. Each network node comprises two buffer elements 41 & 42, into which arriving packets are sorted on arrival at each network node. A flag in the header of each data packet determines which buffer element the packet is switched into. One of the buffer elements 41 is designated as a high priority buffer whilst the other buffer element 42 is designated as a low priority buffer. The high priority buffer 41 has preferential access to the output of the network node such that a majority of the bandwidth used by the network node is reserved for the high priority buffer. The remainder of the output bandwidth of the network node is reserved for the low priority buffer 42, although if the high priority buffer is not using its full bandwidth allocation then the low priority buffer may temporarily use the bandwidth allocated to the high priority buffer until there is a need for the high priority buffer to recommence use of its bandwidth allocation. The buffer elements may be any known form of buffer, for example random access memory, delay line, etc., and may be either electronic or optical buffer elements depending upon the construction of the network node. The two buffer elements 41 & 42 may be either virtually or physically separated. The network node may have more than one high prorate buffer element and/or more than one low priority buffer element.

An example of such a network node may be found in international patent application GB98/02727. The network node may be an IP (Internet Protocol) router, an ATM (Asynchronous Transfer Mode) switch which is switching IP data over an ATM network, or a device with similar or equivalent functionality.

Communication is initiated by the client computer which sends a request to the server computer to transmit a data resource, such as a real time audio or video file, that is stored on the server computer or stored remotely but under the control of the server computer. The request includes sufficient information about the client computer (for example, at least including a network address for the client computer) so that the server computer can transmit a stream of data packets to the client computer. A flag in the header of each transmitted data packet of the stream causes the stream of packets to be switched into the high priority buffer of each network node in the communications path between the server computer and the client computer. This causes the data packets to be transmitted to the client computer with at least a guaranteed minimum delivery rate.

The guaranteed delivery rate may be requested by the client computer when requesting the delivery of the real time data resource. Typically, the upper limit to the guaranteed delivery rate will be determined according to the transmission rate available over the slowest communications link in the server computer-client computer communications path. This may be the link between the client computer and the communications network, which may be a modem dial-up link or a terminal adapter connecting a LAN to the communications network. The lower limit to the guaranteed delivery rate may be determined according to the playback rate required for the real-time data resource, however, if the user of the client computer is prepared to wait before commencing playback of the data and has sufficient local cache capacity then the server may transmit data to the client at a rate which is lower than the playback rate, in response to a request from the client. When delivering data using the high priority buffer element of each network node the actual delivery rate should be significantly in excess of the minimum value of the guaranteed delivery rate. If the data is being delivered to the client via a proxy server, or a network cache held on a second server computer, then it is possible for the data stream to be delivered to the proxy server at a higher rate than the client delivery rate, with the proxy server caching the additional data.

Under most circumstances, the stream of data packets is received by the client computer at a rate significantly greater than that required to play back the real-time data resource. The excess data received by the client computer must be stored in a cache so that it is available for play back when required. This cache may be local, for example, RAM or a disk drive, or it may be remote from the client computer whilst being under the control of the client computer (for example a network cache or disk area on a server which is connected to the client computer via a LAN. In this case the data transfer rate from such a remote cache should be significantly larger than the play back rate of any real-time data resource so that the transfer of data from the remote cache to the client computer does not become the performance limiting step of the communication link). The size of the local cache is very much dependent upon the capabilities of the client computer, but there is a possibility that the amount of excess data received by the client computer is greater than the capacity of the local cache. In order to prevent overflow of the local cache, and subsequent loss of data, it is necessary for the client to send a control message to the server computer when the local cache is filled to an upper threshold level, which should be less (typically only slightly less) than the total capacity of the local cache (allowing for the time need for the transmission and processing of the control message).

The control message, when received by the server computer, causes the server computer to instruct the internetworking protocols to change the flag that controls into which network node buffer element the data streams are switched, causing the data packets to be switched into the low priority buffer element in each network node in the communications path between the server and the client. This has the effect of stopping the guaranteed delivery of the data packet stream to the client, with the data packet stream being delivered on a 'best effort' basis. Additionally, the use of the low priority buffer means that packets may be lost between the server and the client, or that data packets may arrive out of sequence in the data packet stream. If these effects occur then the protocols that are used to control communications between the server and the client will have to be able to remedy them, i.e. by requesting re-transmission of packets and re-ordering packets received out of sequence.

If the client receives the packet stream at a rate which is still above the playback rate of the real-time data resource, then the local cache will continue to fill, albeit at a slower rate. This indicates a lightly loaded communications network, which tends to be a rare occurrence. If this situation were to continue, then there is a chance that the local cache could overflow, resulting in lost data. This situation may be remedied by the client sending a control signal to the server to request the server to transmit the data stream at a lower rate. Additionally, if there are low demands being placed on both the high priority buffer and the low priority buffer then there is a possibility that the data delivery rate could actually increase when the low priority buffer is being used. If this situation does occur then the client can send a control signal to the server to request the server to transmit the data stream at a lower rate.

If the packet stream is delivered to the client at exactly the playback rate of the real-time data resource then the local cache storage level will stay constant until all of the data packets have been received by the client, at which point the storage level of the local cache will decrease as the remainder of the real-time data resource is played back from the local cache.

If the packet stream is delivered to the client at less than the playback rate, then the local cache storage level will decrease at a rate equal to the difference between the playback rate and the data delivery rate. If the local cache is relatively large and the rate at which the local cache is emptied is relatively small then the entire real-time data resource may be received and then played back by the client without the local cache emptying and data being lost. However, if the local cache is relatively small and the rate at which the local cache is emptied is relatively large, then the local cache will become empty whilst the data packet stream is being delivered at a rate lower than that required for playback, resulting in partial or complete loss of the playback of the real-time data resource. To prevent this, the client sends a second control message to the server when the storage level of the local cache reduces to a lower threshold level, which should be at least slightly above the point at which the local cache becomes empty. This second control message, when received by the server computer, causes the server computer to change the flag that controls into which network node buffer element the data packets are switched, causing the data packets to be switched into the high priority buffer element in each network node in the communications path between the server and the client. This has the effect of recommencing the guaranteed delivery of the data packet stream to the client, increasing the rate at which the data packet stream is received by the client and causing the client to receive sufficient data for uninterrupted playback of the real-time data resource whilst also increasing the storage level of the local cache.

This process may be repeated iteratively as required, decreasing the data delivery rate as the storage level of the local cache reaches the upper threshold and increasing the data delivery rate as the storage level of the local cache reaches the lower threshold, until the entire data resource has been delivered to the client and played back by the client.

The communications network used in the invention may use the standard internetworking protocol suite, i.e. TCP/IP, but the invention may be implemented using any connection-less communications network. The server computer may be a World Wide Web (WWW) server, whilst the client computer may be a personal computer (PC) or network computer (NC) running a WWW browser application program, such as Netscape Navigator™ or Microsoft Internet Explorer™, or a personal digital assistant (PDA) device such as a Palm Pilot™ or a Psion™ series organiser. Additionally, terminals for third generation mobile systems (such as UMTS [Universal Mobile Telephony System]) and mobile telephone handsets with enhanced functionality may be used as a client computer.

It will be understood that in a large communications network there will be multiple server computers and multiple client computers, with many data streams being transmitted between various combinations of servers and clients. In order to ensure that the network nodes in the communications path between a particular server and a particular client are able to transmit the data stream at the guaranteed data delivery rate it is necessary for some form of admission control to be applied to the network nodes. At the simplest level, this may involve each network node only admitting a certain number of data streams into the high priority buffer, with no further data streams being admitted once all of the bandwidth allocated to the high priority buffer is in use. The network node may also reject data streams if there is insufficient buffer capacity to support all of the data streams. Another consideration is that a data stream that is being transmitted by the low priority buffer may need to be switched to the high priority buffer if the local cache of the associated client computer is nearly empty. In order to ensure efficient network operation it is necessary that the probability that a data stream is not admitted into the high priority buffer from the low priority buffer is small.

An alternative variant to the above discussed method which can reduce the frequency with which data streams are switched from one buffer to the other can be achieved by the use of adaptive playback rates, the limits of which may be controlled by the client computer. If data is being transmitted to the client using the high priority buffers and the storage level of the local cache is increasing then it is likely that the upper threshold level will be reached, causing the client computer to signal to the server computer that the data should be transmitted using the low priority buffers. To prevent this occurrence and reduce the frequency with which data streams are switched between buffers, the client computer increases the playback rate based on an algorithm that is controlled by the instantaneous average rate at which the playback buffer is being filled. Provided the playback rate is not changed too rapidly and is kept within certain limits, the playback quality can be kept within acceptable limits. Similarly, if the local cache storage level is decreasing then the playback rate can be adaptively decreased in order to reduce the possibility of the lower threshold being reached. The playback rate limits can be determined in response to the transmission performance or the congestion of the network or by the user of the client computer. This technique may be particularly useful when multicasting because different users in the multicast group can experience different congestion conditions, and controlling the server under such conditions may be undesirable unless absolutely necessary.

This approach is primarily a method for temporarily delaying any action, other than within the client, for responding to transient congestion effects. The advantages are that short duration congestion effects can be accommodated without having to change the buffer(s) being used to transmit data streams and that the number of control signals that might be generated in this period is reduced.

A further alternative method of transmitting real time data to the client can be envisaged where the request by the client to the server to initiate the transmission of the real time data resource contains additional instructions which cause defined portions of the real time data resource to be transmitted using selected buffers. For example, the request could instruct the server to transmit a defined number of bytes using the high priority buffer and then start using the low priority buffer to transmit the remainder of the real time data resource. The client would use its knowledge of its own resources and operating speeds, current network performance, etc., to determine the number of bytes to be transmitted using the high priority buffer. This removes the need for the client to send a control message to the server when the local cache storage level reaches the upper threshold. This approach could also be used when a return to the high priority buffer is triggered by the local cache storage level reducing to the predetermined lower threshold, the client requesting a portion of the real time data resource to be sent using the high priority buffer with the size of the portion being calculated so as to restore the local cache storage level to approximately the upper threshold. An advantage of this method is that when returning to the use of the high priority buffer, the server would be able to specify to the network node (s) the number of bytes it would be transmitting using the high priority buffer, which may enable more versatile techniques for efficiently controlling use of the high priority buffer.

Figure 3:
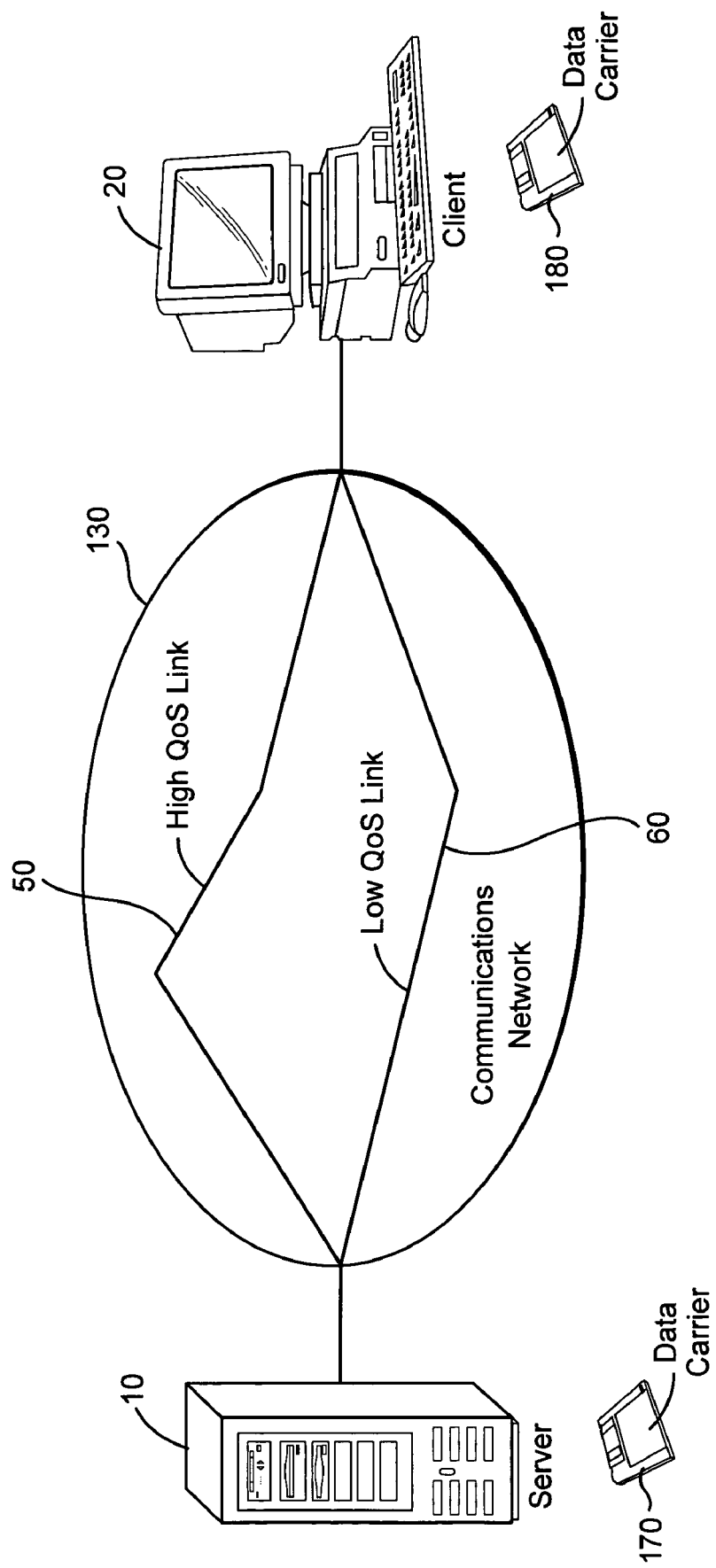
FIG. 3 shows a schematic depiction of a communications network over which a method of communication according to an alternative embodiment of the invention may be used.

FIG. 3 shows a schematic depiction of a communications network over which a method of communication according to an alternative embodiment of the invention may be used. Server computer 10 is connected to client computer 20 via a communications network 130.

The communications network 130 is able to send data between computers connected to the communications network using communications links that have different quality of service (QoS) classes, that is, some of the communications links provide a high class of QoS, whereas another set of communications links provide a low class of QoS. In general, the greater the level of QoS provided by a communications link, the greater the level of resources required to provide the communications link.

The communications network comprises at least one high quality communications link 50 between the server computer 10 and the client computer 20. The high quality communications links 50 provide a guaranteed quality of service for the transmission between the server computer and the client computer i.e. they provide a high class of QoS. The communications network additionally comprises at least one low quality communications link 60 between the server computer 10 and the client computer 20. The lower-quality communications links may provide either a guaranteed quality of service, at a lower QoS level than a high quality communications link, or transmit date on a "best effort" basis, i.e. they provide a low class of QoS.

In a similar manner to that described above, data is transmitted from the server computer 10 to the client computer 20 using the high quality communications link 50, following a request from the client computer to receive a real-time data resource from the server computer. If the data stream is delivered to the client computer at a greater rate than the playback rate of the real-time data resource then the 'excess' of data will be stored in a local cache at the client computer. In order to prevent the local cache from being over-filled the client computer will send a control message to the server computer when an upper threshold of cache capacity is reached. The control message prompts the server computer to switch data transmission from the high quality communications link to a low quality communications link. If the data delivery rate of the low quality communications link is adequate then it will be possible for the client computer to receive and play back the entirety of the real-time data resource. However, if the data delivery rate of the low quality communications link is significantly less than the playback rate of the real-time data resource then a lower threshold of local cache capacity may be reached. If this occurs then, in order to prevent the local cache from being emptied and the playback of the real-time data resource from being interrupted, a further control message is sent from the client computer to the server computer. This control message prompts the server computer to switch the data transmission from the low quality communications link to a high quality communications link so that data is delivered to the client at a rate which is greater than the playback rate of the real-time data resource. The switching between a high quality and a low quality communications link (and vice versa) may be repeated as often as is required in order for the real-time data resource to be transmitted from the server computer to the client computer.

Alternatively, the server computer may transmit data to the client computer using the low quality communications link first and then switch to a high quality communications link.

The communications network 130 may be an ATM (Asynchronous Transfer Mode) network, which is a connection-based network, in which case the high quality communications links may be provided using a Switched Virtual Circuit (SVC) and the low quality communications links may be provided by transmitting data using Available Bit Rate (ABR) links or low transmission rate Constant Bit Rate (CBR) links.

The communications network may use the internetworking protocols (i.e. a connection-less network) and the high quality communications links may be established using the Resource Reservation Set-up Protocol (RSVP) and the low quality communications links may be established using the Internet Protocol (IP).

Figure 2:
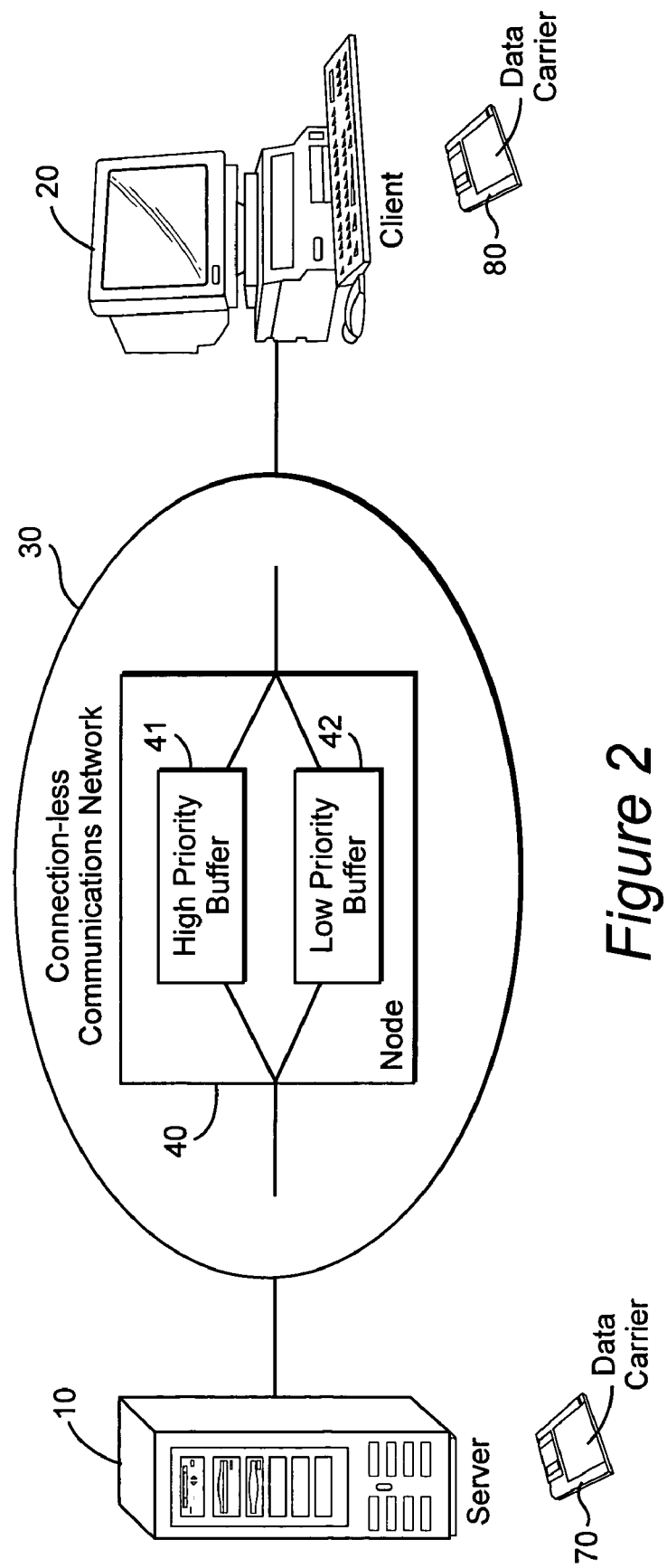
FIG. 2 shows a further schematic depiction of a communications network over which a method of communication according to the invention may be used.

It will be understood that the above methods of transmitting and receiving data can be implemented by the execution of a suitable computer program(s) on the server computer and the client computer. For example, if the server computer is a WWW server then such programs may be run in parallel with the software program required to provide a WWW server, or integrated within such a WWW server program. Similarly, if the client computer is a PC or NC running a WWW browser then suitable program(s) may be integrated within or run in parallel with the WWW browser program. These suitable programs may be supplied on a data carrier such as a floppy disk, CD-ROM, magneto-optical disk, DVD (Digital Versatile Disk), etc. Similarly, such programs could be provided over a telecommunications network. FIG. 2 shows data carriers 70 and 80 which store suitable programs for the server computer and client computer respectively and FIG. 3 shows similar data carriers 170 and 180 which store suitable programs for the server computer and client computer respectively.

What is claimed is:

1. A method of transmitting data stream of packets from a server computer to a client computer over a communications network, said stream of packets being routed between the server and client computers by a packet network node;
   the packet network node having an input to receive said stream of packets from the server computer, the input being connected to first and second packet queues, said packet queues being connected to an output channel of predetermined bandwidth, wherein the first packet queue is preferentially allocated a portion of an output bandwidth and the second packet queue is allocated a remaining portion of the output bandwidth such that packets received in the first packet queue are transmitted in preference to packets received in the second packet queue; the method comprising:
   (i) transmitting packets in said stream of packets from the server computer to the client computer via the first packet queue of the network node; and
   (ii) upon receipt by the server computer of a first control signal from the client computer, transmitting subsequent packets in said stream of packets from the server computer to the client computer via the second packet queue of the network node;
   wherein packets received at the network node are directed to said first or second packet queues in dependence upon the presence of a first or second identifier respectively in said packets; and
   said server computer transmits packets containing said first identifier prior to receiving said first control signal and after receiving said first control signal transits packets containing said second identifier.

2. A method of transmitting a stream of packets from a server computer to a client computer as in claim 1, wherein the method comprises the further step of
   (iii) reverting to transmitting packets in said stream of packets from the server computer to the client computer using the first packet queue of the network node upon receipt by the server computer of a second control signal from the client computer.

3. A method of transmitting a stream of packets from a server computer to a client computer as in claim 2, wherein the second control signal is generated by the client computer in response to a level of data stored in a client computer data cache attaining a second threshold value which is lower than a first threshold value.

4. A method of transmitting a stream of packets from a server computer to a client computer as in claim 1, wherein the first control signal is generated by the client computer in response to a level of data stored in a client computer data cache attaining a first, upper threshold value.

5. A method of transmitting a stream of packets from a server computer to a client computer according to claim 1 wherein:
   a communications route between the server computer and the client computer comprises more than one network node; and
   a selection of either the first or the second packet queues in response to a control signal occurs within one or more of the network nodes which comprise the communications route between the server computer and the client computer.

6. A tangible computer program storage medium containing computer executable code for loading into at least one computer acting at least as said server computer for the performance of the method of claim 1.

7. A method of receiving a stream of packets at a client computer from a server computer, the stream of packets being routed over a communications network by a network node;
   the network node having an input to receive packets in said stream from the server computer, the input being connected to first and second packet queues, said packet queues being connected to an output channel of predetermined bandwidth, wherein the first packet queue is preferentially allocated a portion of an output bandwidth and the second packet queue is allocated a remaining portion of the output bandwidth such that packets received in the first packet queue are transmitted in preference to packets received in the second packet queue; the method consisting of:
   (i) the client computer receiving packets in said stream of packets from the server computer via the first packet queue of the network node; and
   (ii) the client computer receiving subsequent packets in said stream of packets from the server computer via the second packet queue of the network node in response to the transmission of a first control signal from the client computer to the server computer;
   wherein packets received at the network node are directed to said first or second packet queues in dependence upon the presence of a first or second identifier respectively in said packets; and
   said server computer transmits packets containing said first identifier prior to receiving said first control signal and after receiving said first control signal transits packets containing said second identifier.

8. A method of receiving a stream of packets at a client computer from a server computer as in claim 7, wherein the method includes the additional step of
   (iii) the client computer receiving packets in said stream of packets from the server computer via the first packet queue of the network node in response to the transmission of a second control signal from the client computer to the server computer.

9. A method of receiving a stream of packets at a client computer from a server computer as in claim 8, wherein the second control signal is generated by a client computer in response to a level of data stored in a client computer data cache attaining a second threshold value which is lower than a first threshold value.

10. A method of receiving a stream of packets at a client computer from a server computer as in claim 7, wherein the first control signal is generated by the client computer in response to a level of data stored in a client computer data cache attaining a first, upper threshold value.

11. A method of receiving a stream of packets at a client computer from a server computer as in claim 7, wherein:
- a communications route between the server computer and the client computer comprises more than one network node; and
- a selection of either the first or the second packet queues in response to a control signal occurs within one or more of the network nodes which comprise the communications route between the server computer and the client computer.

12. A tangible computer program storage medium containing computer executable code for loading into at least one computer acting at least as said server computer for the performance of claim 7.

13. A server computer for transmitting a stream of packets to a client computer over a communications network, the stream of packets being routed between the server and client computers by a network node;
- the network node having an input to receive said stream of packets from the server computer, the input being connected to first and second packet queues said packet queues being connected to an output channel of predetermined bandwidth, wherein the first packet queue is preferentially allocated a portion of an output bandwidth and the second packet queue is allocated a remaining portion of the output bandwidth such that packets received in the first packet queue are transmitted in preference to packets received in the second packet queue;
- (i) means for transmitting packets in said stream of packets from the server computer to the client computer using the first packet queue of the network node; and
- (ii) means for transmitting subsequent packets in said stream of packets from the server computer to the client computer using the second packet queue of the network node upon receipt by the server computer of a first control signal from the client computer;
- wherein packets received at the network node are directed to said first or second packet queues in dependence upon the presence of a first or second identifier respectively in said packets; and
- said server computer transmits packets containing said first identifier prior to receiving said first control signal and after receiving said first control signal transits packets containing said second identifier.

14. A server computer as in claim 13 further comprising:
- (iii) means for reverting to transmitting packets in said stream of packets from the server computer to the client computer using the first packet queue of the network node upon receipt by the server computer of a second control signal from the client computer.

15. A server computer as in claim 14 wherein the second control signal is generated by the client computer in response to a level of data stored in a client computer data cache attaining a second threshold value which is lower than a first threshold value.

16. A server computer as in claim 13 wherein the first control signal is generated by the client computer in response to a level of data stored in a client computer data cache attaining a first, upper threshold value.

17. A server computer as in claim 13 wherein:
- a communications route between the server computer and the client computer comprises more than one network node; and
- a selection of either the first or the second packet queues in response to a control signal occurs within one or more of the network nodes which comprise the communications route between the server computer and the client computer.

* * * * *